United States Patent
Wooten

[11] Patent Number: 6,112,758
[45] Date of Patent: Sep. 5, 2000

[54] GAS LINE AUTOMATIC SHUT-OFF ASSEMBLY

[76] Inventor: Jeffrey L. Wooten, 36592 Marquardt Ct., New Baltimore, Mich. 48047

[21] Appl. No.: 09/173,805

[22] Filed: Oct. 16, 1998

Related U.S. Application Data

[63] Continuation-in-part of application No. 08/990,171, Dec. 12, 1997, abandoned.

[51] Int. Cl.⁷ .............................. F16K 17/28; F16K 17/40
[52] U.S. Cl. .............................. 137/71; 137/498; 137/519
[58] Field of Search .................................. 137/68.11, 71, 137/498, 519

[56] References Cited

U.S. PATENT DOCUMENTS

| | | | |
|---|---|---|---|
| 572,211 | 12/1896 | McCoy | 137/498 |
| 681,681 | 9/1901 | Collewuie | 137/519 X |
| 805,498 | 11/1905 | Stewart | 137/519 X |
| 2,093,015 | 9/1937 | Madden | 137/498 X |
| 2,403,689 | 7/1946 | Sprague | 137/498 |
| 2,601,654 | 6/1952 | Wright | 137/498 X |
| 3,159,167 | 12/1964 | Mueller et al. | 137/71 |
| 4,513,776 | 4/1985 | Chen | 137/498 |
| 4,833,461 | 5/1989 | Yeager | 137/38 X |
| 5,209,252 | 5/1993 | Perle | 137/38 |
| 5,209,454 | 5/1993 | Engdahl et al. | 137/38 X |
| 5,244,006 | 9/1993 | Pettesh | 137/68.14 X |
| 5,265,641 | 11/1993 | Anderson et al. | 137/460 |
| 5,588,464 | 12/1996 | Tylosky | 137/613 |
| 5,620,022 | 4/1997 | Manoogian | 137/38 X |
| 5,704,385 | 1/1998 | McGill et al. | 137/39 |

FOREIGN PATENT DOCUMENTS

| | | | |
|---|---|---|---|
| 2450407 | 10/1980 | France | 137/498 |

*Primary Examiner*—John Rivell
*Attorney, Agent, or Firm*—Peter D. Keefe

[57] ABSTRACT

A gas line shut-off assembly which is automatically actuated in the event of a catastrophic break of a gas line, wherein gas is retained safely inside the remaining intact portion of the gas line. The gas line shut-off assembly is preferably composed of two mutually cooperating components, a breakaway and a shut-off. The breakaway has a weakened wall section. When connected to a gas line, the breakaway serves as a weakest location of the gas line so that should the gas pipe thereof be subjected to shear forces sufficient to break (ie., rupture) it, the gas line will break firstly at the breakaway. The shut-off is located upstream of the breakaway and is composed of a valve body and a perforated piston. The piston has a head and the valve body has seat, wherein the piston is movable in the valve body between a rest location and a seated location. At the seated location the piston head is sealably seated at the seat, thereby preventing gas flow through the valve body. In operation, during normal gas flow, the piston remains at or near the rest location, but if a break occurs the piston sealingly seats at the seat, shutting gas flow. In the event of breakage, the breakaway provides a break location downstream of the shut-off.

11 Claims, 1 Drawing Sheet

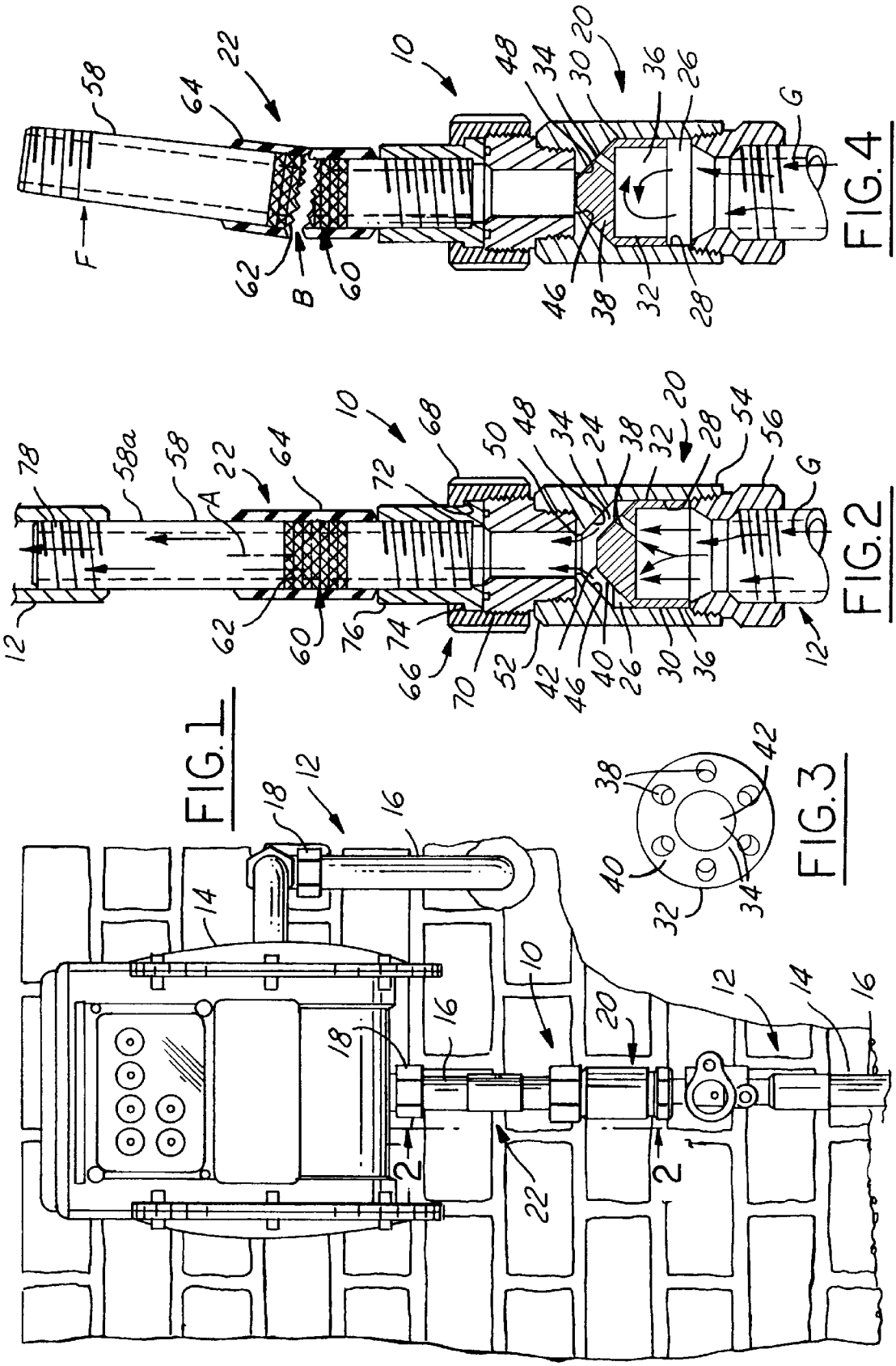

GAS LINE AUTOMATIC SHUT-OFF ASSEMBLY

CROSS-REFERENCE TO RELATED APPLICATIONS

The present application is a continuation-in-part application of Ser. No. 08/990,171, filed on Dec. 12, 1997, now abandoned.

BACKGROUND OF THE INVENTION

1. Field of the Invention

The present invention relates to pressurized gas lines, particularly flammable natural gas lines provided by utilities. More particularly, the present invention relates to an automatic shut-off which is activated upon a catastrophic break in the gas line.

2. Description of the Prior Art

Natural gas has increasingly become an indispensable service for many industrial, commercial and residential utility customers. In order to supply natural gas from the utility to the customer, the utility pressurizes the natural gas and sends it out along a distribution system that includes gas mains. At the customer, a gas line intercepts the gas main, wherein the gas line includes a gas meter and gas pipes.

Natural gas is an extremely efficient and clean source of energy, but must be used with care since it is extremely flammable, indeed explosive. Natural gas is odorless, and in recognition of the danger that leaking natural gas poses, gas utilities scent the natural gas so that a customer can smell leaking natural gas.

Particularly problematic are situations in which the gas line suffers a catastrophic breakage, wherein natural gas rushes out of the broken gas pipe and creates an immediate danger of explosion. Examples of situations which can arise in everyday life that could result in a catastrophic pipe break include motor vehicles accidentally striking a building at the gas line, or natural disasters such as tornadoes, hurricanes or earthquakes, which destroy the building in the vicinity of the gas line. Since in such instances massive amounts of natural gas can collect very rapidly, a catastrophic breakage of a gas line is dangerous for the building occupants, as well as utility workers.

Accordingly, what is needed in the art is a gas line shut-off which is automatically actuated in the event of a catastrophic break of a gas line.

SUMMARY OF THE INVENTION

The present invention is a gas line shut-off assembly which is automatically actuated in the event of a catastrophic break of a gas line, wherein gas is retained safely inside the remaining intact portion of the gas line.

The automatic gas line shut-off assembly according to the present invention is preferably composed of two mutually cooperating components, a breakaway and a shut-off. The breakaway has a weakened wall section. When connected to a gas line, the breakaway serves as a weakest location of the gas line so that should the gas pipe thereof be subjected to shear forces sufficient to break (ie., rupture) it, the gas line will break firstly at the breakaway. The shut-off is located upstream of the breakaway and is composed of a valve body and a piston. The piston has a frustoconically shaped head having holes at the annular chamfer thereof. The valve body has seat in the form of an annular bevel concentric to an outlet. The piston is movable in the valve body between a rest location and a seated location. At the rest location, the piston holes allow gas passage through the piston even where the annular sidewall of the piston is closely spaced with respect to the cylinder sidewall of the valve body. At the seated location the piston head is sealably seated at the seat, thereby preventing gas flow through the outlet.

In operation, the automatic gas line shut-off assembly is connected with the gas line upstream of the gas meter, preferably at about ground level. During normal gas flow, the piston remains at or near the rest location, wherein gas flows freely through the valve body and out the outlet. In this regard, the gas flows freely through the piston via the piston holes at the annular chamfer.

In the event a gas flow catastrophe happens, the resulting gas flow rate will greatly increase over the normal gas flow rate, causing a large pressure differential at the head of the piston which forces the piston toward the seat. As a result, the piston is caused to be firmly seated at the seat, whereupon the gas flow is stopped.

In the event a gas line break catastrophe happens, the breakaway will breakingly yield before the gas pipe of the gas line breaks, thereby ensuring that the gas pipe breaks off downstream of the shut-off. The shut-off thereupon operates as described above to stop the gas flow.

Accordingly, it is an object of the present invention to provide an automatic shut-off for pressurized gas lines in the event of a catastrophic failure thereof.

It is an additional object of the present invention to provide a shut-off for a pressurized gas line which is automatically actuated by the increased gas flow associated with a breakage of the gas line.

It is a further object of the present invention to provide an automatic gas line shut-off assembly which provides a predictable break location of the gas line downstream of a shut-off, wherein the shut-off is operably responsive to an increased gas flow rate associated with the break.

These, and additional objects, advantages, features and benefits of the present invention will become apparent from the following specification.

BRIEF DESCRIPTION OF THE DRAWINGS

FIG. 1 is a side view of a gas line equipped with the automatic gas line shut-off assembly according to the present invention.

FIG. 2 is a partly sectional side view of the gas line equipped with the automatic gas line shut-off assembly according to the present invention, seen along line 2—2 of FIG. 1.

FIG. 3 is a top plan view of a piston of a shut-off of the automatic gas line shut-off assembly according to the present invention.

FIG. 4 is a partly sectional side view of the gas line equipped with the automatic gas line shut-off assembly, as in FIG. 2, wherein the gas line has suffered a catastrophic breakage.

DETAILED DESCRIPTION OF THE PREFERRED EMBODIMENT

Referring now to FIG. 1, the automatic gas line shut-off assembly 10 according to the present invention is depicted in operative combination with a conventional gas line 12. In this regard, the gas line 12 includes a connector pipe 14 which interfaces with a gas main (not shown) from a natural gas utility, a gas meter 14, and associated gas pipes 16 and couplings 18. Further in this regard, the automatic gas line shut-off 10 includes a shut-off 20, and, preferably, a breakaway 22. The shut-off 20 serves to selectively stop flow of pressurized gas inside the gas line 12 so that in the event of a catastrophic breakage of the gas line, gas flow will be stopped. The breakaway 22 serves to provide a predictable gas pipe break location downstream of the shut-off in the event the gas line is subjected to shear forces sufficient to break (ie., rupture) the gas line.

With additional reference now to FIGS. 2 through 4, the structure and function of the automatic gas line shut-off assembly 10 according to the present invention will be described with greater specificity.

The shut-off 20 is composed of a valve body 24 having an internal hollow space 26 defined by a cylinder wall 28. Within the hollow space 26 is situated a freely movable piston 30. The piston 30 is cylindrically shaped having an annular sidewall 32 which is spaced slightly from (proximate) the cylinder wall 28. Connected with the annular sidewall 32 is a piston head 34. The piston head 34 and the annular sidewall 32 preferably define a hollow piston interior 36. The annular chamfer 40 of the piston head 34 is provided with a plurality of piston holes 38. The annular chamfer 40 is preferably oriented at about 45 degrees with respect to the annular sidewall 32. The top 42 of the piston head 34 is preferably flat, thereby forming a frustoconical shape inclusive of the annular chamfer 40. As FIG. 2 depicts, gas G flows into the hollow space 26 of the valve body 24, then passes almost entirely through the piston 30 and out through the piston holes 38, and to a much smaller extent between the cylinder wall 28 and the annular sidewall 32. To facilitate gas passage through the piston 30, it is preferred for the piston holes 38 to be acutely angled with respect to the annular sidewall 32, preferably parallel with respect to the annular chamfer 40.

The downstream end of the hollow space 26 of the valve body 24 forms a piston head seat 46. The piston head seat 46 is in the form of an annular bevel 48 which is reciprocably shaped to that of the annular chamfer 40, and forms a centrally located outlet 50 which is approximately the dimension of the top 42 of the piston head 34.

The downstream end 52 of the valve body 24 is structured for being interfaced with a gas line, or, more preferably to the breakaway 22. The upstream end 54 of the valve body 24 is threadably engaged with a gas line connector 56 which serves to trap the piston 30 in the hollow space 26 and to connect the valve body to a gas line 12.

As comparatively shown at FIGS. 2 and 4, the piston 30 is movable between a rest location at the upstream end of the hollow space 26 (see FIG. 2) and a seated location at the downstream end of the hollow space (see FIG. 4), to wit, the piston head seat 46. When the piston head 34 is seated at the piston head seat 46, the hollow space 26 is sealed, thereby preventing gas G from passing out the outlet 50 downstream of the piston head seat. When the piston 30 is not at the seated position, gas G is flowable out through the outlet 50.

When the piston is at the rest position, the piston holes 38 are widely separated from the piston head seat 46 and widely separated from the cylinder wall 28 on account of the piston holes location at the annular chamfer 40. Accordingly, gas G freely flows through the piston 30 and out the piston holes 38, and then out through the outlet 50 even where the annular sidewall 32 is closely spaced to the cylinder wall 28. For example, a preferred separation between the annular sidewall 32 and the cylinder sidewall 28 is about a mil (0.001 of an inch), and the separation of the annular chamfer 40 at the piston holes 38 from the piston head seat 46 and the cylinder wall 28 is at least one or two orders of magnitude larger (ie., for example about 100 mils).

The breakaway 22 is composed of a pipe segment 58 having a scored section 60 on the pipe wall 62 thereof. The scored section 60 is preferably in the form of a plurality of cuts 62 in the pipe wall 62 which weaken but do not cut through or in anyway compromise the gas confining integrity of the pipe segment 58. The scored section 60 is preferred to be in the form of cuts 62 at various angles, such as f or example longitudinal, transverse and diagonal cuts, wherein the longitudinal axis is parallel to a pipe axis A of the pipe segment 58 at the scored section (see FIG. 2). The various angles of the cuts 62 provides high likelihood that one or more cuts will be oriented close to or at a break-off angle of the pipe segment in general compliant response to the angle of an applied shear force F (see FIG. 4). Preferably, a protective elastomeric sleeve 64, such as for example a rubber, is placed over the scored section 60, wherein it is preferred for the sleeve to be brightly colored, such as for example a fluorescent red, and to be with or without relevant warnings such as "CAUTION—NO WRENCH" and "Install vertically this end up." The sleeve 64 is structured to bend and break if the scored section 60 bends or breaks.

It is preferred to install the breakaway 22 so that a wrench will not act upon the scored section 60, lest twisting forces result in the scored section cracking open. In this regard, it is preferred to connect the breakaway 22 to a union 66 at one end thereof. The union 66 includes an annular flange 68 threadably engaged to a first union member 70. The annular flange 68 has an annular lip 72 which abuts an annular step 74 of a second union member 76. In operation, the annular flange 68 is threaded tightly onto the first union member 70, whereupon the first and second union members are sealingly engaged with respect to each other without placing a twisting force on the second union member.

The downstream end 78 of the pipe segment 58 is threadably engaged with the gas line 12. The upstream end of the pipe segment 58 is threadably engaged with the second union member 76. Preferably, the second union member 76 is threadably engaged with the upstream end 52 of the valve body 24, whereby the shut-off 20 and the breakaway 22 are mutually interconnected into an assembly.

Installation of the automatic gas line shut-off assembly 10 is as follows. With the union 66 loose, the gas line connector 56 is threadably interconnected with an upstream portion of a gas line 12, preferably near the ground level, and the downstream end of the pipe segment is also threadably interconnected with a downstream portion of the gas line. The union is then tightened. Since the weight of the piston is employed to keep it at the resting position, it is important for the valve body to be oriented axially vertical so that the gravitational force acting on the piston biases it to the resting location. While it is an alternative possibility to use an internal spring to bias the piston away from the piston head seat 46, the simplicity of gravity biasing is preferred.

In operation of the automatic gas line shut-off assembly 10, gas G under pressure enters the valve body 24 from the upstream portion of the gas line and then passes through the valve body via passage almost entirely through the piston 30 and out through the piston holes 38, and to a much lesser extent via passage between the cylindrical wall 28 and the annular sidewall 32. The gas thereupon exits the valve body through the outlet 50, passes along the pipe segment 58, and then enters into the downstream portion of the gas line.

In this regard, under normal gas delivery rates, the piston moves only a little away from its resting location in response to differential in pressure generated by the gas flow dynamics acting on the piston, as shown at FIG. 2.

In the event a catastrophic breakage of the integrity of the gas line occurs downstream of the shut-off 20, then gas will rapidly exit the gas line, resulting in a gas flow rate much larger than normal, for example on the order of between about 100 to 250 times the normal gas flow rate. This increased gas flow rate results in a greatly increased pressure differential across the piston. The increased pressure differential easily overcomes the weight of the piston and firmly seats the piston head 34 sealingly into the piston head seat 46. The pressure differential between high pressure upstream of the piston and the much lower atmospheric pressure downstream of the piston assures that the piston head will remain sealingly seated at the piston head seat even when gas flow has ceased by sealing action of the piston with respect to the valve body (as shown at FIG. 4).

Now, in the event the catastrophic event which allowed uncontrolled gas venting from the gas line was due to a gas line break occasioned by a pipe breaking due to a shear force F acting on the gas line (see FIG. 4), then it is preferred for the breakaway 22 to break first and thereby provide a predetermined break location of the gas line. The ability for the breakaway to locate the break B is important because it assures that the break will be downstream of the shut-off 20 and also that the structure and attitude of the shut-off will remain intact even as the break ensues.

As shown at FIG. 4, the cuts 62 of the scored section 60 provide relief in response to a shear force F, wherein the pipe wall 58a will break at one or more cuts that represent the weakest location thereof in compliant reaction to the particular direction and magnitude of the shear force.

By way of example, a preferred form of the automatic gas line shut-off assembly 10 for natural gas application, the components are structured for a working pressure of 600 PSIG, and formed of cold non-shock bronze, wherein the valve body is investment cast. Pipe size interface ranges from one to three inches.

It is to be understood that the shut-off operates independently of the breakaway, so that the breakaway, while preferred to be present, does not need to be included for the shut-off to operate to stop gas flow as described herein. Further, while a natural gas line is the preferred environment of use, any pressurized gas line may advantageously be provided with the automatic gas line shut-off assembly according to the present invention, whether or not the gas is flammable.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An automatic shut-off assembly for a pressurized gas line, comprising:
   piping for providing a conduit for a pressurized gas and for connecting to a pressurized gas line;
   a shut-off connected to said piping for stopping gas flow through said piping in response to the gas flow reaching a predetermined gas flow rate; and
   a breakaway section connected to said piping downstream of said shut-off for providing a predetermined break location of said piping in response to a predetermined magnitude of shear force applied to said piping;
   wherein said breakaway section comprises a scored section of said piping, said scored section comprising a plurality of cuts formed in said piping, and wherein said plurality of cuts are oriented at a plurality of angles, said plurality of angles comprising longitudinal, transverse and diagonal angles, wherein the longitudinal axis is parallel to a pipe axis of the piping at said scored section.

2. The automatic shut-off assembly of claim 1, further comprising an elastomeric sleeve coveringly situated over said scored section.

3. The automatic shut-off assembly of claim 2, wherein said piping comprises union means for connecting said piping to the gas line substantially torquelessly with respect to said scored section.

4. The automatic shut-off assembly of claim 1, wherein said shut-off comprises:
   a valve body having an interior hollow space defined by a cylinder wall, said interior hollow space having an upstream end and an opposite downstream end, said valve body having an outlet at said downstream end, said valve body being connected to said valve means;
   a piston movable in said interior hollow space between a rest location spaced from said downstream end and a seated location at said downstream end, said piston having a weight, wherein said piston comprises:
      an annular sidewall; and
      a piston head connected to said annular sidewall, said piston head having an annular chamfer, wherein said annular chamfer has a plurality of piston holes formed therethrough;
   a piston head seat located at said downstream end, said piston head seat comprising an annular bevel, wherein said annular chamfer and said annular bevel are mutually reciprocal such that when said piston is at said seated location said annular chamfer is sealingly engaged with said annular bevel;
   weight means for springlessly biasing said piston toward said resting location solely by force of gravity acting on said piston so that said piston will move to said seated location in response to gas flowing through said interior hollow in a direction from said upstream end to said downstream end reaching a predetermined flow rate.

5. The automatic shut-off assembly of claim 4, further comprising an elastomeric sleeve coveringly situated over said scored section.

6. The automatic shut-off assembly of claim 5, wherein said piping comprises union means for connecting said piping to the gas line substantially torquelessly with respect to said scored section.

7. An automatic shut-off assembly for a pressurized gas line, comprising:
   piping for providing a conduit for a pressurized gas and for connecting to a pressurized gas line;
   a shut-off connected to said piping for stopping gas flow through said piping in response to the gas flow reaching a predetermined gas flow rate;
   a breakaway section connected to said piping downstream of said shut-off for providing a predetermined break location of said piping in response to a predetermined magnitude of shear force applied to said piping, wherein said breakaway section comprises a scored section of said piping, said scored section comprising a plurality of cuts formed in said piping; and
   an elastomeric sleeve coveringly situated over said scored section.

8. The automatic shut-off assembly of claim 7, wherein said plurality of cuts are oriented at a plurality of angles, said plurality of angles comprising longitudinal, transverse and diagonal angles, wherein the longitudinal axis is parallel to a pipe axis of the piping at said scored section.

9. The automatic shut-off assembly of claim 8, wherein said piping comprises union means for connecting said piping to the gas line substantially torquelessly with respect to said scored section.

10. The automatic shut-off assembly of claim 9, wherein said shut-off comprises:

a valve body having an interior hollow space defined by a cylinder wall, said interior hollow space having an upstream end and an opposite downstream end, said valve body having an outlet at said downstream end, said valve body being connected to said valve means;

a piston movable in said interior hollow space between a rest location spaced from said downstream end and a seated location at said downstream end, said piston having a weight, wherein said piston comprises:

an annular sidewall; and a piston head connected to said annular sidewall, said piston head having an annular chamfer, wherein said annular chamfer has a plurality of piston holes formed therethrough;

a piston head seat located at said downstream end, said piston head seat comprising an annular bevel, wherein said annular chamfer and said annular bevel are mutually reciprocal such that when said piston is at said seated location said annular chamfer is sealingly engaged with said annular bevel;

weight means for springlessly biasing said piston toward said resting location solely by force of gravity acting on said piston so that said piston will move to said seated location in response to gas flowing through said interior hollow in a direction from said upstream end to said downstream end reaching a predetermined flow rate.

11. The automatic shut-off assembly of claim 10, wherein said plurality of cuts are oriented at a plurality of angles, said plurality of angles comprising longitudinal, transverse and diagonal angles, wherein the longitudinal axis is parallel to a pipe axis of the piping at said scored section.

* * * * *